Aug. 15, 1933.          W. V. LANE          1,922,592
VEHICLE SIGNAL
Filed Aug. 25, 1930

INVENTOR.
Weldon V. Lane
BY Lancaster, Allwine and Rommel
ATTORNEYS.

Patented Aug. 15, 1933

1,922,592

UNITED STATES PATENT OFFICE 1,922,592

VEHICLE SIGNAL

Weldon V. Lane, Asbury Park, N. J.

Application August 25, 1930. Serial No. 477,719

3 Claims. (Cl. 177—329)

The present invention relates to improvements in vehicle signals and the primary object of the invention is to provide an improved vehicle signal adapted to be mounted upon a vehicle in such manner as to display various signals both forwardly and rearwardly of the vehicle.

A further object of the invention is to provide an improved vehicle signal embodying a series of independent signalling compartments, with novel means for preventing passage of light from one compartment to another.

A further object of the invention resides in the novel manner in which the signal panels are positioned and held in place to permit ready and easy renewing of the panels.

A further and important object of the invention is to provide a vehicle signal of neat and durable construction and one which may be readily mounted in various positions upon the vehicle for displaying like signals both forwardly and rearwardly of the vehicle.

Other objects and advantages of the invention will be apparent during the course of the following detailed description, taken in connection with the accompanying drawing forming a part of this specification and in which drawing.

Figure 1:
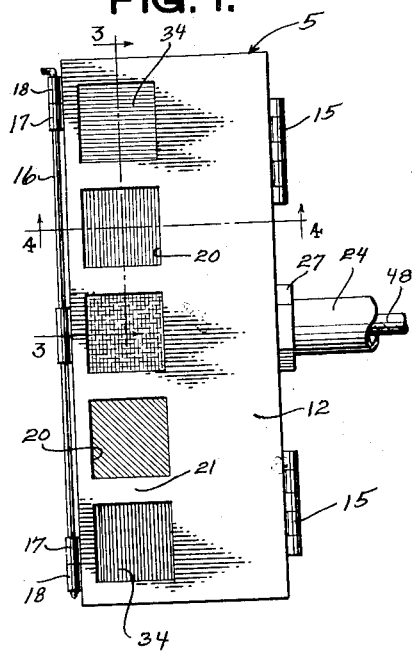
Figure 1 is a plan view of the improved vehicle signal.

In the drawing, and wherein similar reference characters designate corresponding parts thruout the several views, the improved signal has been shown comprising an oblong-shaped box or casing 5 including a main body portion 6 and a cover 7 adapted for closing the open side of the body portion 6.

The casing is preferably formed from a suitable gauge of sheet metal and the body portion 6 is formed with inner and outer side walls 8 and 9 respectively, top and bottom walls 10 and 11 respectively and a display wall 12 preferably forming the rear wall of the signal casing. The cover 7 for closing the open side of the body portion 6 is formed with a display wall 13 provided about its marginal edges with a flange 14 for engaging over the body portion 6. The cover 7 is hingedly connected at one edge as by suitable hinges 15 to the inner side wall 8. The display wall 13 when in a closing position over the body portion 6 provides a front casing wall of substantially like dimensions as that of the rear display wall 12. The cover 7 is preferably retained in a closed position over the body portion 6 by means of an elongated retaining pin 16 adapted to be passed thru axially aligning sleeves 17 and 18 mounted respectively upon the outer wall 9 of the body portion 6 and the flange along the free edge of the cover 7. These sleeves 17 and 18 are so arranged as to align in pairs when the cover is in a closed position so that the cover will be securely held at three points along height of the casing.

Figure 5:
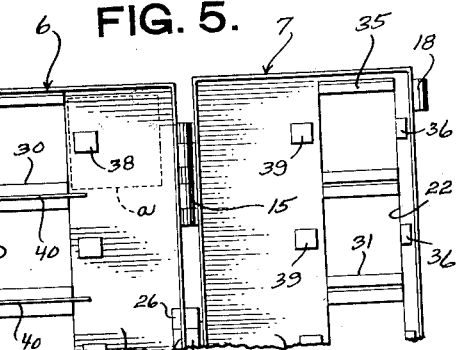
Figure 5 is a fragmentary view showing the casing in an open position and prior to assembling of the signal panels and lamps within the casing.

Provided in the display wall 12 and arranged in a vertical row adjacent the outer wall 9 is a series of preferably square-shaped sight openings or windows 20 and in the example shown, being five in number, for the display of five different signals. The upper and lowermost windows 20 are spaced slightly from the top and bottom walls of the body portion 6, and the windows are spaced by narrow strips 21 forming webs serving to stiffen the outer wall 9. These sight openings or windows 20 as will be observed in Figure 5 are of less width than one half the width of the wall 12 to permit proper and easy placing of the signal panels in a manner to be later described.

The cover 7 has provided in the display wall 13, adjacent the free or swinging edge of the cover, a vertically disposed row of sight openings or windows 22 of a shape corresponding to that of the windows 20 and so arranged as to align with the windows 20 when the cover is in a closed position. The windows 22 are spaced by narrow webs 23. By observing Figure 5 it will be seen that the windows 22 are also of a width less than one-half the width of the display wall 13 and that the windows are spaced inwardly from the free edge of the wall.

The signal casing is preferably mounted by means of a tubular bracket arm 24 having a threaded end 25 adapted to be passed thru the inner casing wall 8 preferably midway its height and threaded into a suitable nut or the like 26 secured as by soldering, welding or the like to the inner side of the wall 8. A locking nut 27 is threaded upon the tubular arm into engagement with the outer surface of the wall 8 for locking the casing in position upon the arm and retaining the signal casing in a vertical position.

The tubular supporting arm 24 may be attached in any preferred manner to the vehicle and is preferably mounted upon the front left hand corner post of the vehicle so that the signals will be readily visible from both the front and rear of the signal and the rearwardly displayed signals being visible to the driver.

Secured longitudinally to the inner side of each web 21 is a retaining strip 30, while secured longitudinally to the inner side of each web 23 is a retaining strip 31 and these strips 31 are of like construction as that of the strips 30. The retaining strips 30 and 31 are preferably pressed from sheet metal and are formed with channeled portions 32 provided along their open edges with oppositely extending right angular flanges 33. These strips 30 and 31 are preferably of a length equal to the length of the webs 21 and 23 and are secured to the webs as by soldering or welding the channeled portions 32 to the webs. The retaining strips 30 and 31 have the flanges 33 thereof co-acting with the webs 21 and 23 to provide confronting grooves along the upper and lower edges of the windows 20 and 22 for slidably receiving translucent signal panels 34 which are preferably formed of glass and are adapted to be shifted laterally into proper position over the windows. The upper and lowermost signal panels are secured along one edge by means of Z strips 35 secured to the display walls 12 and 13 above and below their respective series of sight openings.

Figure 2:
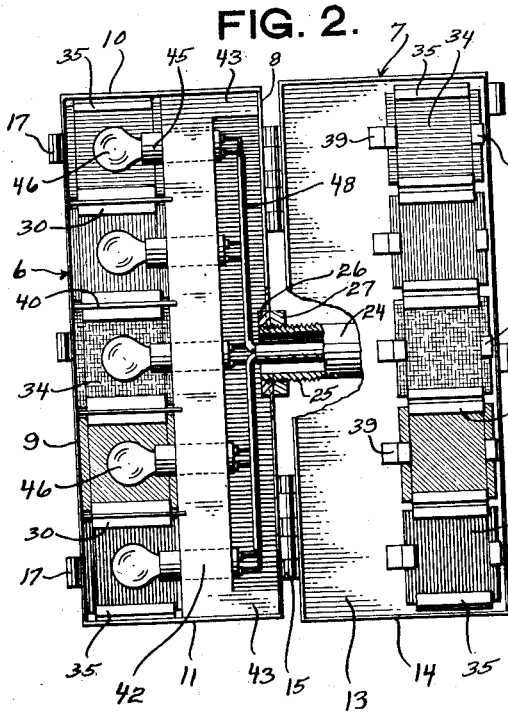
Figure 2 is a view showing the hinged door swung to an open position to disclose the interior arrangement of parts.

The signal panels 34 are preferably square-shaped and a dimension slightly greater than the dimension of the windows 20 and 22 so that the marginal edges of the panels will extend beyond each edge of the windows. While the signal panels may be of any desired color and arranged in a different order than that shown in Figures 1 and 2, it is preferred that the upper set of panels be colored blue for designating a left turn, the next lower set of panels being colored pink for indicating a right turn, the next lower set of panels being amber colored for indicating caution, the next lower set of panels being colored green for indicating "GO", and the lowermost set of panels being colored red for signalling a stop. By observing Figure 2 it will be seen that the differently colored panels are arranged in pairs so that when the cover is closed, like colored panels will be displayed at like locations upon each side of the casing.

Figure 4:
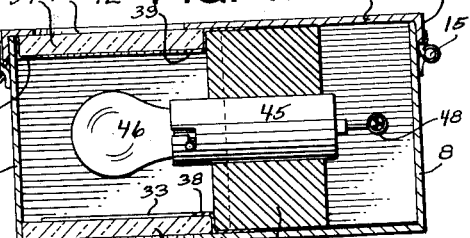
Figure 4 is an enlarged section on the line 4—4 of Figure 1.

The signal panels for the display wall 12 are preferably shifted laterally beneath the flanges of the retaining strip into engagement with the outer side wall 9. The signal panels for the display wall 13 are held slightly spaced from the flange along the free edge of the cover by means of angle-shaped stops 36 for allowing the free edge of the outer wall 9 to pass between the panels and cover flange so that the cover may properly close upon the body portion 6 as shown in Figure 4.

Secured to the inner surface of the display wall 12 adjacent each of the windows 20 is a bendable clip 38, while secured to the inner surface of the display wall 13 one adjacent each of the windows 22 is a bendable clip 39. These bendable clips 38 and 39 may be secured to their respective display walls as by soldering, welding or the like and serve to hold the display panels 34 in position over the display windows.

Arranged between each of the windows 20 is a separator or parting strip 40 having one edge fitting in and preferably secured to the channeled portion 32 of the retaining strips 30. One side edge of these separators engage the outer casing wall 9 and may be suitably secured thereto as by soldering or the like to prevent passage of light. These separators 40 are of a depth substantially equal to the depth of the main body portion 6 and have their inner edges projecting slightly beyond the inner edges of the windows 20 as clearly shown in Figure 5, and project beyond the inner ends of the retaining strips 30.

Referring particularly to Figure 5, and the manner in which the signal panels may be placed in position over the sight openings or windows, the panels are first placed in a position as shown by dotted lines at "a" so as to lie flat upon either of the walls 12 or 13 adjacent one of the windows 20 or 22. The panels may then be shifted laterally into proper position over the windows and then held in place by bending the clips 38 or 39 over one edge of the panels.

Figure 3:
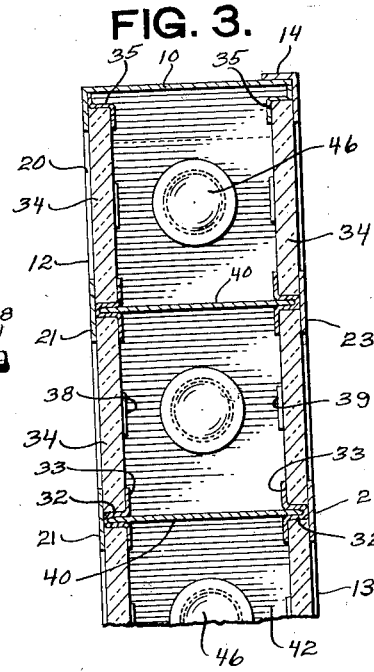
Figure 3 is an enlarged fragmentary section on the line 3—3 of Figure 1.
Figure 6:
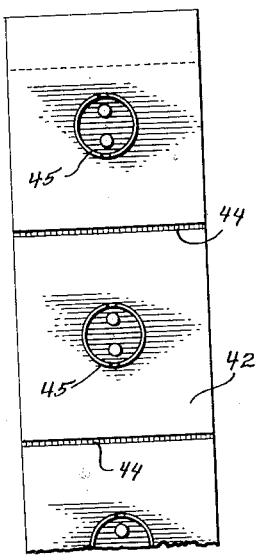
Figure 6 is an enlarged fragmentary face plan view of the lamp support for removable positioning in the casing.

When the cover 7 is in a closed position over the main body portion 6 the rear edges of the separators will engage in the channeled portions of the retaining strips 31 and thus exclude passage of light past the forward edges of the separators. By observing Figure 3 it will be seen the manner in which the forward edges of the separators 40 engage in the channeled portions of the strip 31 when the cover 7 is in a closed position over the open side of the body portion 6.

Slidably and removably fitting in the body portion 6 is a lamp supporting block 42 of a length equal to the height of the casing and having a width substantially equal to the depth of the body portion 6. The block 42 is provided adjacent each end with extensions 43 adapted to engage the inner casing wall 8 and retain the body portion of the block in engagement with the inner edges of the separators 40. The outer flat side of the block is provided with a number of suitably spaced grooves 44 adapted to slidably receive the inner edges of the separators when the block is moved into position, and these grooves serve to prevent passage of light from one signal compartment to another when the block is assembled in the casing.

Mounted in the block 42 are suitable lamp sockets 45, one of which is provided for each of the signal compartments, and these sockets are each adapted to receive a signal lamp 46 for illuminating the signal compartments. As will be observed in Figures 3 and 4, a signal lamp 46 is arranged in each signal compartment between each companion pair of signal panels and thus the light rays from the lamp will shine both forwardly and rearwardly and display signals visible from both the front and rear of the casing.

The extensions 43 provide a compartment between the inner side of the lamp support and the inner casing wall 8 and this compartment provides space for connecting the electric wires 48 to the respective lamps. The signal lamps are independently connected to a suitable switch arrangement disposed at any preferred location in the vehicle whereby the operator may independently light either of the lamps for displaying the proper signal. The electric wires 48 are led thru the tubular support 24 and are thus concealed from view.

Thus it will be seen that a novel construction is disclosed which permits ready and easy assembling of the signal and the renewing of signal panels when such becomes necessary. The novel arrangement disclosed also provides an arrangement whereby light from one signal compartment is prevented from passing to the adjacent signal compartment, and it permits of a hinged side being provided for the casing allowing ready and easy renewing of the signal lamps.

Changes in detail may be made to the form of invention herein shown and described, without departing from the spirit of the invention or the scope of the following claims.

I claim:

1. A vehicle signal comprising an oblong casing including a body portion and a hinged cover, said body portion and cover each being provided with a series of aligned vertically arranged sight openings adjacent one side of said body and spaced apart by web portions, said sight openings being of a width less than half the width of the walls in which they are formed, a retaining strip secured longitudinally of the inner side of each web each embodying a channeled portion and retaining flanges spaced from the webs, signal panels slidable beneath the flanges over the sight openings and being of a width less than half the width of the walls in which the sight openings are formed, separators of a width no less than that of the signal panels held in the channeled portions of the retaining strips carried by the webs of the body portion and adapted to have their opposite edges engaged in the channeled portions of the retaining strips carried by the cover to provide independent compartments, and a lamp supporting block removably fitting in the body portion along one side of its sight openings for supporting a signal lamp in each compartment and retaining the signal panels against displacement.

2. In a vehicle signal, an oblong casing including an open sided body portion embodying opposite side walls and a display wall opposite said open side, and a cover embodying a display wall arranged over the open side of the body portion, said display walls each being provided with a series of aligned sight openings of a width less than half the width of the display walls and arranged adjacent one of the side walls of the body portion and spaced by webs, retaining strips secured to the webs of each display wall each embodying a channeled portion and outturned flanges, signal panels supported over the sight openings by said flanges and having a width less than half the width of the display walls, a partitioning plate fitted in the channeled portions of each retaining strip carried by the webs of the body portion and having one edge thereof in engagement with the said side wall of the body portion, a lamp supporting block removably fitting in the body portion in engagement with the opposite edges of the partitioning plates and forming a series of closed compartments, said block retaining the signal panels in the flanges, and a signal lamp supported by the block in each of the compartments.

3. A vehicle signal comprising an oblong casing including an open sided body portion providing a rear display wall opposite said open side, top and bottom walls and opposite side walls, a hinged cover for the open side of the body portion providing a front display wall, a series of sight openings provided in the rear display wall adjacent one side wall, a series of display openings provided in the front display wall for aligning with the sight openings in the rear display wall, both of said series of sight openings being of a width less than half the width of the display walls and spaced by web portions, a retaining strip secured to the inner side of the web portions of each display wall and each embodying a channeled portion and outturned flanges, signal panels slidably fitting over each sight opening and held by said flanges, said signal panels being of a width less than half the width of the display walls, a partition plate fitted in the channeled portion of each retaining strip for the rear display wall and having one edge abutting the said side wall of the body portion, a supporting block slidably fitting in the body portion along one side of its sight openings and having grooves receiving edges of the partition plates, said cover when closed providing a series of independent compartments, and a signal lamp supported in each compartment by said block.

WELDON V. LANE.